United States Patent Office 3,207,205
Patented Sept. 21, 1965

3,207,205
EXTRUSION-DEVOLATILIZATION PROCESS
Joseph Briskin and Charles H. Schramm, both of Easton,
Pa., assignors to J. T. Baker Chemical Company,
Phillipsburg, Pa., a corporation of New Jersey
No Drawing. Filed June 16, 1961, Ser. No. 117,507
4 Claims. (Cl. 159—47)

This invention relates to improved polymers and to processes of preparing the same. More particularly the invention relates to an improvement in the preparation of copolymers of alpha-alkyl styrenes and alkyl methacrylates.

Copolymers of alpha-alkyl styrenes and alkyl methacrylates have been prepared which possess excellent heat resistance, transparency, light stability, weathering characteristics, hardness, resiliency, and scratch resistance when compared with previously known polymers of related monomers. These superior copolymers and processes of preparing them are described in several issued patents, for instance, Canadian Patent 603,165, of August 9, 1960.

The preferred process of preparing these copolymers on a large scale for commercial use is by bulk polymerization wherein the desired proportions of alpha-alkyl styrene and alkyl methacrylate are heated in a reaction vessel with a suitable free-radical producing catalyst. Under the best conditions the crude product may contain from 8% to 12% of residual monomers. For example, a polymer of 75 parts by weight of methyl methacrylate and 25 parts by weight of alpha-methyl styrene when polymerized with benzoyl peroxide for seven days at temperatures within the range 90°–120° C. contained about 10% of residual monomers. This polymer could not be injection molded or extruded into useful articles. The polymer had a heat distortion temperature below 100° C. and decomposed upon heating above this temperature. Such polymers containing unreacted monomers rapidly turn yellow when exposed to sunlight. However, removal of the unreacted monomers converts the product into a polymer which has a heat distortion temperature as high as 120° C. and which is very color stable in sunlight. As a general rule, each one-tenth of one percent unreacted monomer in the copolymer lowers the heat distortion temperature by one degree C. It is necessary, therefore, when preparing polymers of this kind to remove the unreacted monomers in some manner.

Walling (J. Am. Chem. Soc., 70, 1543 (1948) ) prepared polymers from methyl methacrylate and alpha-methylstyrene, but was never able to obtain a useful product by his techniques. The residual monomer content of his polymers was 68% and, thereby, represented articles of no utility. No commercially-feasible method for the isolation of polymer was proposed.

Unreacted monomers may be removed from copolymers of this type by dissolving the crude product in a solvent and pouring the solution into a liquid which precipitates the polymer, or by grinding up the crude material and extracting it with a solvent. Alternatively, the monomers may be removed by steam stripping. The polymer must then be filtered and dried. It can be seen that these polymerization processes add greatly to the cost of the finished product. In addition, polymers which have been subjected to these processes are not suitable for uses where optical qualities are desired. In accordance with the present invention and contrary to what would be expected, a thermally unstable copolymer is subjected to a very high temperature to remove unreacted monomers and surprisingly, the resulting polymer is made more stable.

We have discovered that the undesired residual monomers can be removed from the crude polymer in a very simple and inexpensive manner to yield polymers which have more desirable characteristics than polymers which have been purified by the solvent extraction or steam distillation procedures mentioned above. The purification process of the present invention includes the steps of subjecting the polymer to a temperature within the range 400°–640° F. and under a vacuum of 2 to 200 mm. of pressure for a period of time ranging from 3 to 60 seconds. This is most conveniently done by passing the crude polymer, under the proper conditions, through an extruder having a vented section. Fortunately, extruders of this kind are available and are used in preparing polyethylene and other plastic materials for the molding process, hence no new equipment or additional steps are necessary in practicing the present invention. All that is needed is to provide vacuum to the extrusion cylinder as will be described in more particular hereinafter.

To illustrate the advantages to be gained by practicing the invention, copolymers of alpha-methyl styrene and methyl methacrylate were prepared as follows:

*Example I*

Several sixteen fluid ounce bottles were filled with 80 grams of alpha-methyl styrene and 240 grams of methyl methacrylate, 640 milligrams of benzoyl peroxide and 640 milligrams of tertiary dodecyl mercaptan (a polymerization regulator). The bottles were thoroughly purged with nitrogen and then sealed with an air-tight seal. These bottles were heated in an electrically heated air oven and removed at different time intervals. The heating cycle was four days at 95° C. and three days at 115° C. The conversion was measured from time to time on each bottle by dissolving 0.3 gram of the raw polymer in a small quantity of chloroform and reprecipitating by pouring the solution into a large excess of methanol and vacuum drying the reprecipitated copolymer to constant weight at 80° C. The percent by weight of the precipitated polymer of the weight of the raw polymer sample is the estimated conversion.

| Hours of reaction: | Percent conversion |
|---|---|
| 12 | 18.55 |
| 24 | 28.20 |
| 36 | 38.20 |
| 48 | 49.60 |
| 60 | 68.00 |
| 72 | 71.20 |
| 84 | 75.05 |
| 96 | 76.10 |
| 120 | 83.15 |
| 144 | 86.80 |
| 168 | 89.65 |

As will be seen, it required seven days to obtain maximum conversion in this polymerization cycle. The crude product had a heat distortion temperature of less than 100° C. and was otherwise unsatisfactory for molding articles without purification.

*Example II*

Similarly, a series of polymerizations was run using 25 parts by weight of alpha-methyl styrene and 75 parts by weight of methyl methacrylate with 0.2% benzoyl peroxide as the catalyst and using a polymerization cycle of four days at 85° C. followed by three days at 115° C. Five such polymerizations gave crude polymers which contained on an average 86.3% alcohol insolubles, the soluble material comprising 0.59% residual methyl methacrylate and 5.32% residual alpha-methyl styrene. The crude material was unsuited for use but the purified material could be molded to yield products which were resistant to boiling water for periods of at least six months without losing their transparency or shape or changing in physical dimensions. These products had heat distortion temperatures in excess of 120° C. and were highly resistant to strongly alkaline detergents. However, they were slightly deficient in optical quality compared to the products of the present invention.

*Example III*

To illustrate the advantages to be gained by practicing the process of the present invention, crude alpha-methyl styrene and methyl methacrylate copolymers prepared as described above were passed through an extruder of a mutli-step design so that a zone of no pressure could exist in one section. This section was vented and provided with a vacuum pump. The copolymer in the extruder was maintained at a temperature of 515° F. and the rate of feed was such that the polymer passing through the section of reduced pressure was in the zone for approximately 30 seconds. The extruder was operated at 24 revolutions per minute. The orifice through which the copolymer was extruded had a diameter of 0.125 inch. Various degrees of vacuum were applied to the vent and the products that were obtained were examined with the following results:

| Vent Vacuum, mm. | Heat Distortion Temperature, ° C. | Residual Monomer, Percent |
|---|---|---|
| None | 108 | 1.20 |
| 150 | 115 | 0.80 |
| 100 | 116 | 0.80 |
| 50 | 111 | 0.85 |
| 25 | 120 | 0.65 |
| 2–4 | 118 | 0.45 |

As will be seen from the above results, as little as 1.2% of residual monomer lowers the heat distortion temperature of the pure monomer considerably. Its light stability and other characteristics are also adversely affected. However, the application of a specific vacuum to the vent results in removal of much of these undesirable monomers and the obtaining of a copolymer having considerably higher heat distortion temperatures and an improvement in its other physical characteristics.

Vented extruders which can be fitted with a vacuum connection and pump, and used for the present invention are commercially available in several designs. In general they consist of a relatively long pressure resistant cylinder in which a closely fitting screw is centered. As the screw turns, it forces finely divided polymer, which is fed through a hopper at one end of the cylinder, through to a forming die which delivers the extruded polymer in the form of rods, tubes, ribbons, films or other desired shapes. These extruded materials are reduced to pellets, packaged and shipped to the molder. The cylinder is usually fitted with means to heat or cool or otherwise control the temperature of the material passing through the extruder as may be desired. The depth of the threads on the screw and their pitch may vary to provide different conditions of blending, melting, and metering over the length of the cylinder. In vented extruders, the screw threads are deeper at the vent section than those on either side of the vent so as to provide a zone of reduced pressure as the material passes through this section. However, as the polymer passes through this section of the extruder it is in a molten condition and in a state of agitation with fresh surfaces of polymer being constantly exposed to an atmosphere of reduced pressure. This enables free escape of the volatile monomers.

The temperature, pressure and time limits for the extrusion-devolatilization process of the present invention are important. In general, the higher the temperature at the extrusion vent and the higher the vacuum, the more complete is the removal of the monomer. However, extended exposure at very high temperature leads to extensive discoloration and foaming which tends to plug the extrusion vent. Too high a rate of passage through the zone of reduced pressure will result in a polymer containing an excess of monomer. Too slow a rate will subject the polymer to excessive heat and subsequent decomposition. Also, there may be a loss of vacuum in the vent section which in turn results in a product having unduly large amounts of residual monomer. In general, the polymer in the vented section should be at a temperature within the range 400°–640° F. and the pressure should be between 2 and 200 mm. of mercury. The lower the pressure, the better will be the devolatilization. The dwell time of the polymer in the vented section should be within the range 3 to 60 seconds. Various types of extruders are available which can be used in practicing the invention. The single screw type is most commonly used, but the double screw type may also be used. Other types which provide a relatively thin layer of moving polymer at these high temperatures and low pressures can be used as well.

The present invention is particularly suitable to the processing and purification of crude copolymers of alpha-alkyl styrenes and alkyl methacrylates which are prepared as described in the Canadian patent mentioned above. The useful alpha-alkyl styrenes which may be used in forming these copolymers include those in which the alkyl group contains from one to six carbon atoms; that is, those compounds in which the vinyl group attached to the benzene ring is substituted in the alpha position with a methyl, ethyl, propyl, butyl, amyl, or hexyl group which may be either straight or branched chain. The useful alkyl methacrylates include those in which the alkyl ester group contains from one to four carbon atoms; for instance, methyl, ethyl, normal propyl, isopropyl, isobutyl, tertiary butyl and the like.

The copolymers of alpha-alkyl styrenes and alkyl methacrylates may be formed from one to 55 parts by weight of the alpha-alkyl styrene and 45 to 99 parts by weight of an alkyl methacrylate. The preferred copolymers comprise 15 to 40 parts by weight of alpha-methyl styrene with 60 to 85 parts by weight of methyl methacrylate. These copolymers may be modified by the addition of small amounts of other polymerizable materials such as acrylonitrile, methacrylonitrile, fumaronitrile, styrene, acrylic esters and the like.

The polymerization is carried out with the aid of a free-radical producing polymerization catalyst such as, for instance, the organic peroxides, persulfates, ozonides, metal alkyls, diazonium salts, diazoates, hydrazines and amine oxides. Among the preferred organic peroxides are benzoyl peroxide, tertiary-butyl hydroperoxide and ditertiarybutyl peroxide. These catalysts are used in concentrations of 0.1 to 0.8% by weight based on the weight of the total monomers in the polymerization mixture.

It is preferred that the polymerization take place within the temperature range 70°–160° C. Ordinarily, the first stages of the polymerization take place at the lower temperature ranges and as the polymerization continues, the temperature is increased as described above and in more detail in the Canadian patent referred to. If desired, a mixture of polymerization catalysts may be used to speed up the overall polymerization time. It is desirable, of course, to convert all of the monomers as completely as possible to copolymers so that there will be as little of monomer to remove as possible. However, as noted above, complete conversion is impossible under the most efficient conditions of polymerization and removal of unreacted monomer is essential to obtain the best products.

We claim:
1. A method of improving the heat resistance and light stability of copolymers of alpha-alkyl styrenes and alkyl methacrylates which comprises passing a crude copolymeric mass comprising 15 to 40 parts by weight of an alpha-alkyl styrene and 60 to 85 parts by weight of an alkyl methacrylate, each of the said alkyl groups having from 1 to 4 carbon atoms, and unreacted monomers through a screw extruder at a temperature within the range of 400° to 530° F. and a vacuum of 2 to 100 mm. of mer- cury absolute pressure for a period of time sufficient to volatilize monomeric materials contained therein and recovering from the extruder, devolatilized copolymer having a heat distortion temperature of at least 110° C.

2. A method of removing unreacted alpha-methyl styrene and methyl methacrylate from a copolymeric mass of a copolymer containing from 15 to 40 parts by weight of alpha-methyl styrene and 60 to 85 parts by weight of methyl methacrylate which comprises the steps of reducing the mass to a relatively small particle size, forcing the material through a screw-type extruder wherein the material is heated to within the temperature range of 400° to 530° F. and while in a fluid turbulent condition, passing the mass through a zone having a pressure within the range 2 to 100 mm. of mercury absolute pressure during a period of time within 3 to 60 seconds and thereafter forcing the fluid mass through an orifice and recovering the copolymer from the extruder, the recovered copolymer having a heat distortion temperature of at least 110° C.

3. A method for improving the heat resistance and light stability of copolymers of alpha-methyl styrene and methyl methacrylate which comprises:
 (a) feeding to a screw type extruder, a crude copolymeric mass consisting essentially of a copolymer of 15 to 40 parts by weight of alpha-methyl styrene and 60 to 85 parts by weight of methyl methacrylate, the crude mass including unreacted monomers of alpha-methyl styrene and methyl methacrylate;
 (b) passing the crude polymeric mass in a molten state through a zone within the screw type extruder maintained at a temperature within the range of from 400° F. to 530° F.;
 (c) applying a vacuum of from about 2 to about 100 millimeters of mercury pressure absolute to the molten copolymeric mass in said zone and removing said unreacted monomers;
 (d) maintaining said crude copolymeric mass in said zone for a period of time sufficient to volatilize monomeric materials contained therein; and
 (e) recovering the copolymer from the extruder, the recovered copolymer having a heat distortion temperature of at least 110° C.

4. A polymer which has been subjected to a process according to claim 3.

References Cited by the Examiner

UNITED STATES PATENTS

| | | | |
|---|---|---|---|
| Re. 23,948 | 2/55 | Fuller. | |
| 1,156,096 | 10/15 | Price. | |
| 2,241,321 | 5/41 | Schlack | 260—78 |
| 2,719,325 | 10/55 | Franklin. | |
| 2,731,081 | 1/56 | Mayner | 159—49 |
| 2,904,109 | 9/59 | Malm | 159—49 |
| 2,992,679 | 7/61 | Twaddle | 159—2 |
| 3,072,622 | 1/63 | Ham | 260—86.7 |
| 3,080,348 | 3/63 | Lang | 260—86.7 |
| 3,082,816 | 3/63 | Skidmore | 159—2 X |

NORMAN YUDKOFF, *Primary Examiner.*

UNITED STATES PATENT OFFICE
CERTIFICATE OF CORRECTION

Patent No. 3,207,205                                September 21, 1965

Joseph Briskin et al.

It is hereby certified that error appears in the above numbered patent requiring correction and that the said Letters Patent should read as corrected below.

Column 3, line 35, for "monomer" read -- polymer --.

Signed and sealed this 26th day of April 1966.

(SEAL)
Attest:

ERNEST W. SWIDER                              EDWARD J. BRENNER
Attesting Officer                                        Commissioner of Patents